US012142038B1

(12) United States Patent
Escandon

(10) Patent No.: US 12,142,038 B1
(45) Date of Patent: Nov. 12, 2024

(54) SYSTEMS AND METHODS OF VEGETATION AND STRUCTURE LOAD ANALYSIS IN AERIAL PROPERTY IMAGES

(71) Applicant: United Services Automobile Association (USAA), San Antonio, TX (US)

(72) Inventor: Rodrigo Escandon, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 256 days.

(21) Appl. No.: 17/539,041

(22) Filed: Nov. 30, 2021

(51) Int. Cl.
*G06V 20/10* (2022.01)
*G06Q 40/08* (2012.01)
*G06T 7/62* (2017.01)
*G06V 10/10* (2022.01)
*G06V 10/26* (2022.01)

(52) U.S. Cl.
CPC .......... *G06V 20/188* (2022.01); *G06Q 40/08* (2013.01); *G06T 7/62* (2017.01); *G06V 10/16* (2022.01); *G06V 10/273* (2022.01); *G06V 20/176* (2022.01); *G06T 2207/10032* (2013.01); *G06T 2207/30184* (2013.01); *G06T 2207/30188* (2013.01)

(58) Field of Classification Search
CPC .... G06V 20/188; G06V 20/176; G06V 10/16; G06V 10/273; G06Q 40/08; G06T 7/62; G06T 2207/10032; G06T 2207/30184; G06T 2207/30188
See application file for complete search history.

(56) References Cited

U.S. PATENT DOCUMENTS

| | | | | |
|---|---|---|---|---|
| 7,058,197 | B1* | 6/2006 | McGuire | G06V 20/188 382/108 |
| 8,760,285 | B2* | 6/2014 | Billman | G06Q 40/08 340/539.11 |
| 11,308,714 | B1* | 4/2022 | Christoudias | G06V 20/176 |
| 11,856,937 | B2* | 1/2024 | Koch | A01M 21/043 |
| 11,913,928 | B2* | 2/2024 | Togami | G06Q 50/02 |
| 2010/0150431 | A1* | 6/2010 | Chen | G06V 20/176 382/154 |
| 2018/0129879 | A1* | 5/2018 | Achtelik | G01C 5/00 |
| 2019/0304026 | A1* | 10/2019 | Lyman | G06Q 40/08 |
| 2020/0202183 | A1* | 6/2020 | Taylor | G06F 18/254 |
| 2021/0166020 | A1* | 6/2021 | Li | G06V 10/28 |
| 2021/0232818 | A1* | 7/2021 | Saxena | G06N 3/04 |
| 2021/0383481 | A1* | 12/2021 | Richardson | G06V 20/17 |
| 2022/0051344 | A1* | 2/2022 | Dhuvur | G06Q 40/08 |

(Continued)

*Primary Examiner* — John B Strege
(74) *Attorney, Agent, or Firm* — Fletcher Yoder P.C.

(57) ABSTRACT

The present disclosure relates to a system that includes one or more processors configured to receive a plurality of aerial property data corresponding to a target property, and applying a height threshold to the plurality of aerial property images. Additionally, the system is configured to remove areas within the plurality of property images that exceed the height threshold, and apply a perimeter calculation to define a perimeter around the target property within the aerial property images. Further, the system calculates an area of the detected vegetation and structures within the perimeter of the aerial property images.

14 Claims, 12 Drawing Sheets

(56) References Cited

U.S. PATENT DOCUMENTS

| | | | |
|---|---|---|---|
| 2023/0078777 A1* | 3/2023 | Raj | G06T 5/80 |
| | | | 382/275 |
| 2023/0259893 A1* | 8/2023 | Janey | G06Q 10/0631 |
| | | | 705/305 |
| 2023/0384158 A1* | 11/2023 | Mori | G01J 3/027 |
| 2024/0029430 A1* | 1/2024 | Jensen | G06V 10/761 |

* cited by examiner

SYSTEMS AND METHODS OF VEGETATION AND STRUCTURE LOAD ANALYSIS IN AERIAL PROPERTY IMAGES

BACKGROUND

The present disclosure relates generally to systems and methods of vegetation and structure load analysis in aerial property images. The present disclosure relates more specifically to systems and methods of determining an amount of vegetation and/or structures around a perimeter of a property, and determining a wildfire risk associated with the property based on the vegetation and/or structures around the property.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

The amount of vegetation and/or structures surrounding a property may impact the properties wildfire risk and impact certain insurance policies (e.g., homeowners insurance) associated with the property. The wildfire risk of a property may vary based on the height of the vegetation (e.g., grass, trees) around the property, distance of vegetation and structures to the property, height of structures around the property, and the like. An insurance provider may visit a property to assess the wildfire risk, but it may be difficult to determine based on observing a property the exact wildfire risk based on the structures and vegetation surrounding the property. Additionally, it may be burdensome for the insurance provider to physically visit every property to provide the assessment of wildfire risk. Therefore, it may be beneficial to use a system that does not need an in-person assessment of wildfire risk, and rather may utilize aerial images of a property to automatically assess the wildfire risk of the property.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes one or more processors that are configured to receive aerial image data associated with a target property and apply a height threshold to the aerial image data. The one or more processors are also configured to remove one or more sections within the aerial image data that exceed the height threshold and apply a perimeter calculation to the aerial image data to define a perimeter around the target property within the aerial image data. Further, the one or more processors are configured to calculate an area of one or more detected vegetation and structures within the perimeter around the target property within the aerial image data.

In another embodiment, a non-transitory computer readable medium includes computer-executable instructions that, when executed by at least one processor, are configured to cause the at least one processor to perform operations that include retrieving height tiles and image tiles corresponding to a target property, and stitching the image tiles to create an image layer and stitching the height tiles to create a height layer. Further, the operations include masking one or more sections of the image layer that correspond to detected vegetation and structures height below a threshold height based on the height layer, calculating an area of the one or more detected vegetation and structures above the height threshold within a defined perimeter of the target property, and displaying the calculated area and the image layer on a user interface.

In an additional embodiment, a method includes receiving, via a processor, an image layer corresponding to a target property and determining areas of the image layer that exceed a height threshold. The method also includes modifying, via the processor, the image layer to remove one or more sections that exceed the height threshold, and determining areas around a perimeter of the target property that correspond to a plurality of vegetation based on applying a normalized difference vegetation index (NDVI) to the image layer. Further, the method includes modifying, via the processor, the image layer to remove areas that do not correspond to the plurality of vegetation based on the NDVI and modifying, via the processor, the image layer to add in structures above the height threshold based on an inverse NDVI analysis. Additionally, the method includes determining, via the processor, one or more defensible perimeters based on determining a structure and vegetation load within the image layer.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
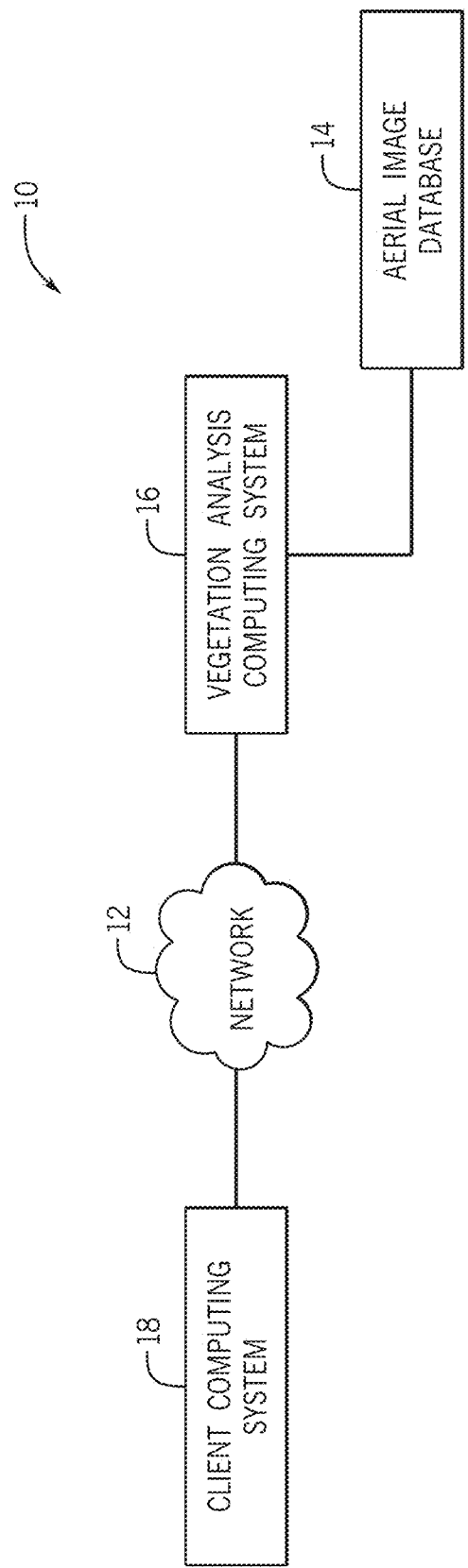
FIG. 1 illustrates a block diagram of a wildfire risk analysis system, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, insurance providers may need to survey a property (e.g., house, apartment) to evaluate a wildfire risk associated with the property. The wildfire risk may correspond to an amount of vegetation and/or structures over a certain threshold height (e.g., 5 feet (ft), 7 ft, 12 ft) in relation to a defined perimeter (e.g., 5 ft, 10 ft, 15 ft, 30 ft) around the property. The wildfire risk of a property may be difficult for an insurance provider to evaluate by physically surveying the property, and the process of physically visiting every property location may be time consuming for the insurance provider. However, it is now recognized that various advantages may be gained by analyzing aerial images of properties for vegetation and structures around the perimeter of the properties, and determining a wildfire risk for the properties without having to physically visit the properties.

Accordingly, the present embodiments relate to analyzing aerial property images for vegetation and/or structures around the property that correspond to wildfire risk at the property. The wildfire risk analysis system may receive one or more images corresponding to a property and the area around the property, and may determine if the perimeter of the property is a defensible perimeter (e.g., low wildfire risk based on amount of vegetation and structures around the property). The system may employ a digital surface model (DSM) to determine heights of vegetation and structures around the property and apply a normalized difference vegetation index (NDVI) to the aerial property images (e.g., infrared images) to determine an amount of vegetation around the property. The system may analyze the aerial image analysis results to determine a percentage of vegetation and/or structure load within one or more perimeters of the property, and determine if the property includes one or more defensible perimeters. Additionally, a communication may be sent to a user device associated with the property corresponding to an insurance policy based on the wildfire risk and/or defensible perimeter determined by the amount of vegetation and/or structures around the property.

It should be appreciated that the aerial images may be updated based on height analysis results prior to NDVI analysis of the aerial images. In this way, the system may filter out vegetation such as grass, trees, shrubs, and the like that are below a threshold height (e.g., 7 ft, 12 ft) associated with an increased wildfire risk. In some cases, the disclosed techniques may be used in combination with other types of analysis methods, to determine a wildfire risk for a property based on an amount of vegetation and/or structures around a property.

Additionally or alternatively, the wildfire risk analysis system may make insurance policy decisions based on the wildfire risk and if the property is determined to have a defensible perimeter. The wildfire risk may be based on an amount of vegetation and/or structures above a threshold height within a defined perimeter of the property. The property area may be excluded in determining the percentage of vegetation and/or structure load surrounding the property to ensure that the percentage of vegetation and/or structure area to the area surrounding the perimeter of the property is efficiently calculated. In addition, the system may analyze an amount of foliage corresponding to the vegetation, or any other additional data relating to wildfire risk for the property.

With the foregoing in mind, FIG. 1 illustrates a block diagram of a wildfire risk analysis system 10, in accordance with an embodiment of the present disclosure. The wildfire risk analysis system 10 may include a network 12 that facilitates communication between a vegetation analysis computing system 16 and a client computing system 18. An aerial image database 14 may be accessed by the vegetation analysis computing system 16 and may store a plurality of image data (e.g., infrared image data, digital surface data) corresponding to one or more properties. The image data may be aerial image data collected by one or more drones that include a camera component, one or more airplanes with a camera component, and the like that may survey a plurality of geographical areas that include one or more properties. The aerial image data may be retrieved by the vegetation analysis computing system 16 based on target coordinates (e.g., latitude, longitude) associated with one or more properties of interest. The vegetation analysis computing system 16 may be associated with an insurance provider, utility company, and the like. The vegetation analysis computing system 16 may query the aerial image database 14 based on the target coordinates corresponding to one or more properties of interest, and retrieve the aerial image data that corresponds to the target coordinates. The vegetation analysis computing system 16 may then analyze the aerial image data of one or more properties, and may separate the image data by property or into groups of nearby properties. Additionally, the vegetation analysis computing system 16 may divide the aerial image data into one or more tiles corresponding to geographical coordinates of the aerial image data, so that analysis may be conducted on the image data in an efficient manner. Elevation analysis may be applied to each image tile, so that structures and/or vegetation below a certain height threshold may be masked from the image data.

The vegetation analysis computing system 16 may analyze the aerial image data based on height (e.g., elevation) and may filter out structures and/or vegetation below a certain height threshold. The height threshold may correspond to a tree and/or structure height threshold that has been determined to increase wildfire risk at a property. For example, the height threshold may correspond to vegetation above 7 feet and structures above 12 feet, or any suitable amount that corresponds to increased wildfire risk. The height threshold may vary based on geographical area, state mandated vegetation requirements and/or structure heights for insurance coverage, or any other suitable height consideration.

The vegetation analysis computing system 16 may mask (e.g., remove from image, black out from image) grass, smaller vegetation, shorter objects (e.g., trashcans, recycling bins, trampolines) that are not a wildfire risk within the aerial image data. This may increase processing efficiency of the vegetation analysis computing system 16, due to not having to analyze the vegetation and objects excluded based on height in later image analysis steps. The height analysis uses digital surface data to exclude low elevation vegetation and/or structures. The image data masked according to the height analysis, may then go through a vegetation analysis process which includes applying a Normalized Difference Vegetation Index (NDVI) to the image data (e.g., infrared image data) to identify vegetation within the image and exclude houses, garages, or other structures at the property that may still be displayed after the height analysis. It should be understood, that the vegetation analysis computing system 16 may apply the NDVI calculations to the image data initially, and then may conduct a height analysis on the image data that has already been analyzed for the vegetation. Additionally, the structures above the height threshold that may be masked due to not being vegetation, may be added back into the image using an inverse NDVI calculation to be considered in calculations for determining a defensible perimeter (e.g. low wildfire risk).

The vegetation analysis computing system 16 may be associated with insurance providers, emergency responders, or other organizations that would like to determine a wildfire risk for one or more properties. The vegetation analysis computing system 16 may determine based on the height and NDVI analysis of the image data, the percent area of vegetation and/or structures relative to the area surrounding the defined perimeter/s of the property (e.g., house, townhouse). The percent area of vegetation and/or structures to the total area may be within a certain perimeter of the surrounding area of the property. For example, the vegetation and/or structures may be within 5 feet, 10 feet, 20 feet, 30 feet, or any suitable amount from the property. The vegetation analysis computing system 16 may determine if the vegetation and/or structure load (e.g., area) of the perimeter exceeds a threshold value associated with an increased wildfire risk. If the vegetation analysis computing system 16 determines that the percent vegetation and/or structure load within a certain perimeter of the property exceeds the threshold percent vegetation and/or structure load corresponding to the perimeter, the vegetation analysis computing system 16 may send a communication to the client computing system 18 that includes a modification to the insurance and/or insurance offer based on the increased wildfire risk. The threshold value may vary based on the distance the defined perimeter is from the property. For example, the closer the perimeter is to the property the threshold vegetation and/or structure load value may increase as a result of the property being closer to the vegetation and/or structure that is a wildfire risk. In some embodiments, the defensible perimeter may be determined based on vegetation and structure load within one or more perimeters of the property, or vegetation load within the one or more perimeters of the property.

Figure 2:
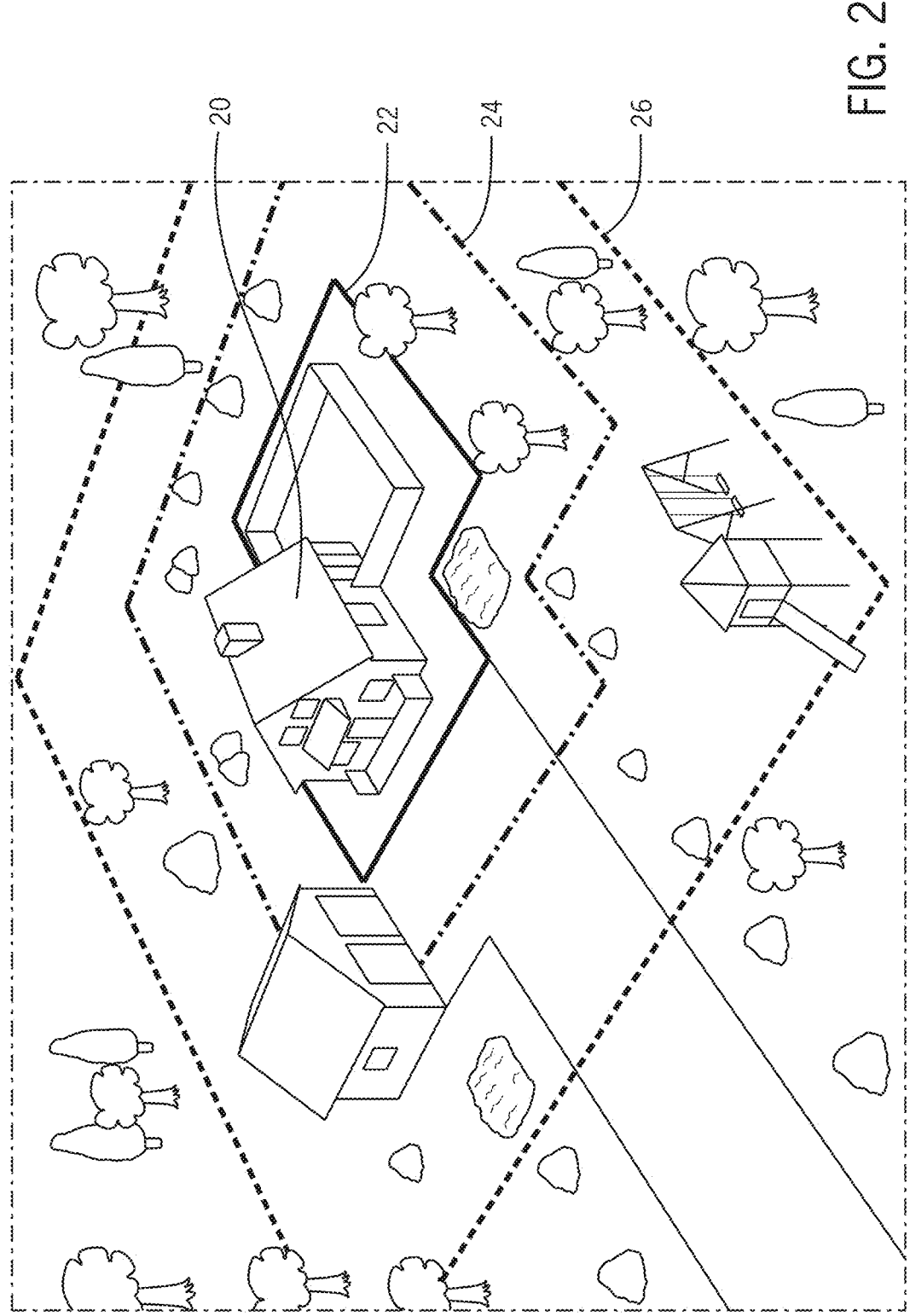
FIG. 2 illustrates multiple perimeters determined for a property, in accordance with an embodiment of the present disclosure.

FIG. 2 illustrates multiple perimeters determined for a property 20, in accordance with an embodiment of the present disclosure. The vegetation analysis computing system 16 may analyze one or more perimeters of the property 20 based on vegetation load and structure load of the established one or more perimeters to determine a wildfire risk for the property 20.

The perimeters around the property 20 may be determined based on a wildfire risk level associated with the property 20. For example, the first perimeter closest to the property 20 may be defined as an immediate zone 22 and may include any vegetation and/or structure within 0 to 5 ft of the property 20. The second perimeter may be defined as an intermediate zone 24 and may include all vegetation and/or structures within 5 ft to 30 ft of the property 20. Additionally, a third perimeter may be defined as an extended zone and may include any vegetation and/or structures within 30 ft to 100 ft of the property 20. It should be understood that the vegetation analysis computing system 16 may define any number of perimeters within any suitable distance of the property.

The vegetation analysis computing system 16 may then calculate vegetation and/or structural load within each defined perimeter of the property 20. For example, the vegetation analysis computing system 16 may determine the area (e.g., area within the aerial images) of vegetation and/or structures relative to the total area of the perimeter for the immediate zone 20. The vegetation analysis computing system 16 may also filter out all vegetation and/or structures below a set height threshold that corresponds to wildfire risk. The height threshold may be greater for the immediate zone 22 compared to the intermediate zone 24 and extended zone 26 due to proximity to the property 20. It should be understood that the vegetation analysis computing system 16 may establish any suitable number of perimeters and/or height thresholds based on property 20 size and/or a geographical area the property 20 is located in.

The vegetation analysis computing system 16 may then determine if the perimeter is a defensible perimeter based on threshold vegetation and/or structure load values. The vegetation analysis computing system 16 may calculate the vegetation and/or structure load values individually for each perimeter, and may establish if each perimeter is a defensible perimeter based on the calculated values. The vegetation and/or structure load values may vary based on perimeter distance from the property 20. For example the immediate zone 22 may correspond to threshold vegetation and/or structure load values of 20%, and the extended zone 26 may correspond to threshold vegetation and/or structure load values of 60%. It should be understood that the threshold vegetation and/or structure load values may correspond to any suitable value that corresponds to wildfire risk to the property 20.

Figure 3B:
FIG. 3B illustrates an image layer generated by stitching the plurality of image tiles of FIG. 3A, in accordance with an embodiment of the present disclosure.
Figure 3A:
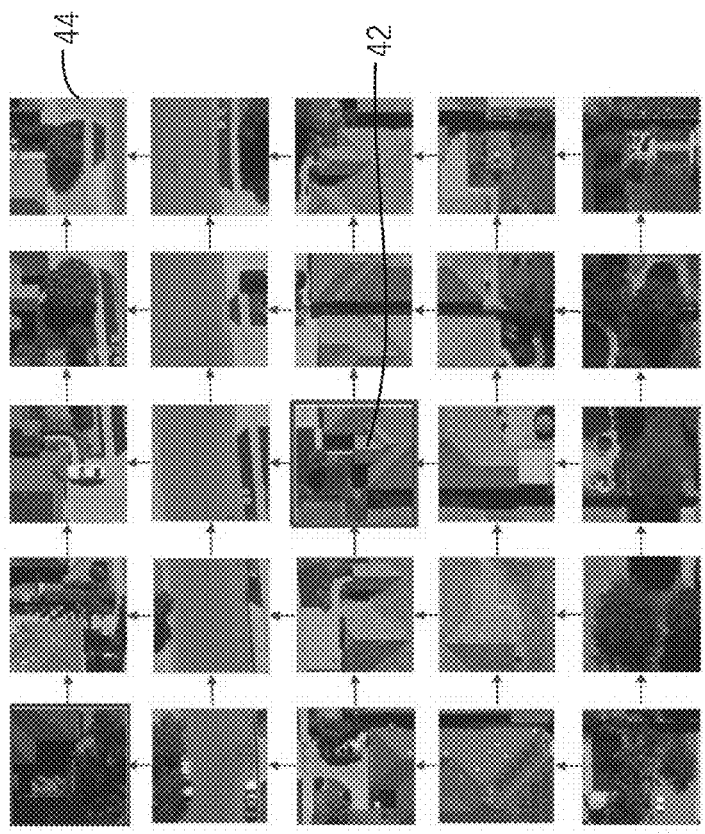
FIG. 3A illustrates a plurality of image tiles corresponding to one or more properties, in accordance with an embodiment of the present disclosure.

FIG. 3A illustrates a plurality of image tiles corresponding to one or more properties, in accordance with an embodiment of the present disclosure. The vegetation analysis computing system 16 may initially receive aerial image data (e.g., infrared image data) that corresponds to latitude and longitude coordinates of the requested property data. To analyze the data with respect to height of vegetation and structures within the aerial property data, the latitude and longitude coordinates of the image data may be converted to tile coordinates of image data (e.g., 63 feet (f)×63 f). The individual tile sizes may correspond to a size of about 19 meters (m)×19 m. The vegetation analysis computing system 16 may download the center tile 42 that corresponds to the coordinates (e.g., latitude, longitude) of the center of the structure of interest and may calculate the surrounding tiles 44 using the center tile 42 as a reference point. The structure of interest may correspond to a property that is requesting an insurance quote, a property covered by the insurance provider associated with the vegetation analysis computing system 16, and the like.

FIG. 3B illustrates an image layer generated by stitching the plurality of image tiles of FIG. 3A, in accordance with an embodiment of the present disclosure. The vegetation analysis computing system 16 may stitch together the center tile 42 and the surrounding tiles 44 retrieved from the aerial image database 14 corresponding to target property to create the image layer 46 that can be used for further analysis. The image layer 46 may correspond to one or more properties and include the property of interest, and may be saved to one or more databases for later use.

With the foregoing in mind, 4A illustrates a plurality of height tiles (e.g., digital surface data) corresponding to heights of one or more properties, vegetation, and structures surrounding the properties, in accordance with an embodiment of the present disclosure. The vegetation analysis computing system 16 may initially download a center height tile 50 corresponding to the target structure latitude and longitude coordinates and may calculate the surrounding height tiles 52 based on the center height tile 50. The maximum height may vary per tile, and all the tiles may correspond to height differences in feet, or any other suitable measurement unit. The height tiles may need to be normalized due to differences in height color across one or more houses within the geographical coordinates of the height tiles and pools or other below ground structures. For example, all height tiles may be normalized to a low elevation of 0 feet. The height data may correspond to digital surface data, and be used to exclude low elevation structures and vegetation during the image analysis.

Figures 4A, 4B:
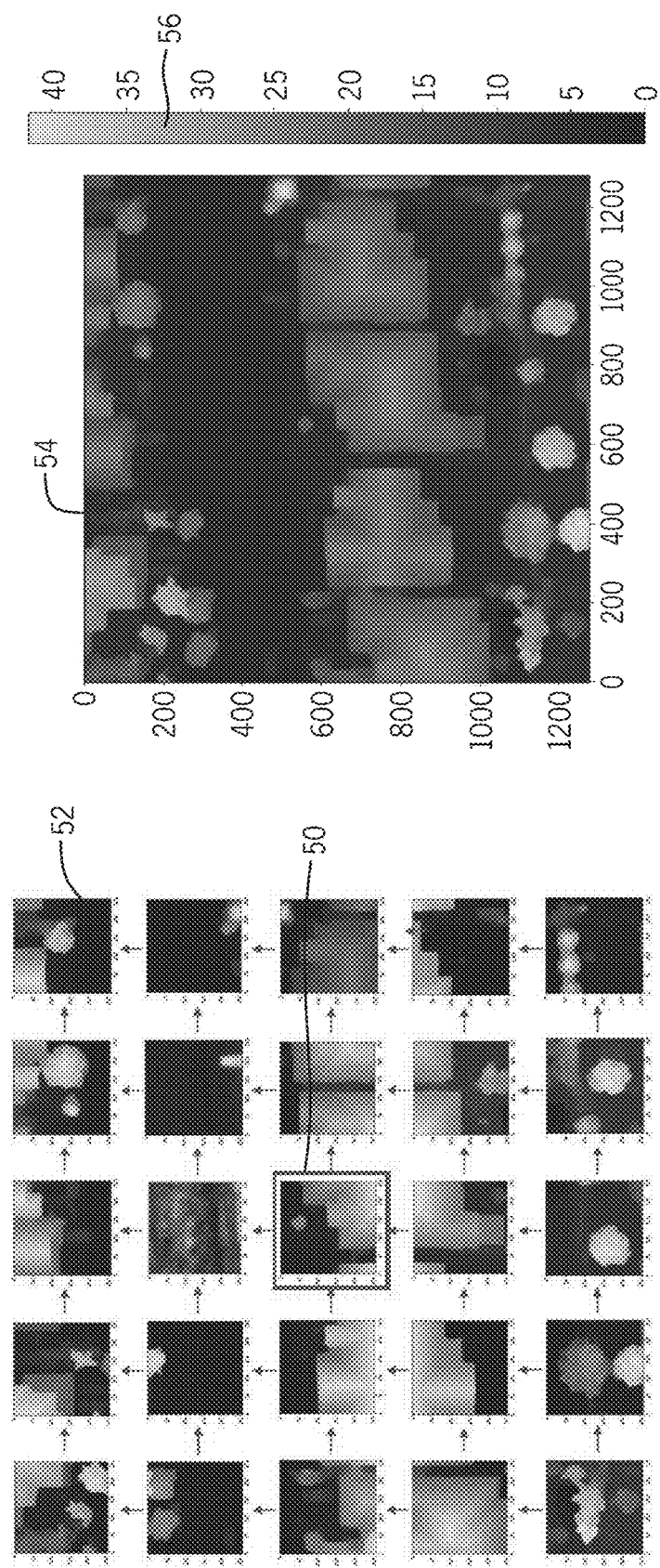
FIG. 4A illustrates a plurality of height tiles corresponding to heights of one or more properties and vegetation and structures surrounding the properties.
FIG. 4B illustrates a height image layer generated by stitching the plurality of height tiles of FIG. 4A, in accordance with an embodiment of the present disclosure.

FIG. 4B illustrates a height image layer generated by stitching the plurality of height tiles of FIG. 4A, in accordance with an embodiment of the present disclosure. The height tiles of FIG. 4A may be stitched together to create a height image layer 54. As discussed above, the color within the height image layer 54 may correspond to various heights according to a height scale 56 from 0 feet to 40 feet. The height image layer 54 may also include normalized height data corresponding to the one or more properties. The height data may then be analyzed to exclude certain vegetation and structures surrounding the target properties that are below a certain height threshold. The height image layer 54 may be compared to the image layer 46, and the image layer 46 may be updated based on the vegetation and structures that exceed the height threshold according to the height image layer 54.

Figure 5:
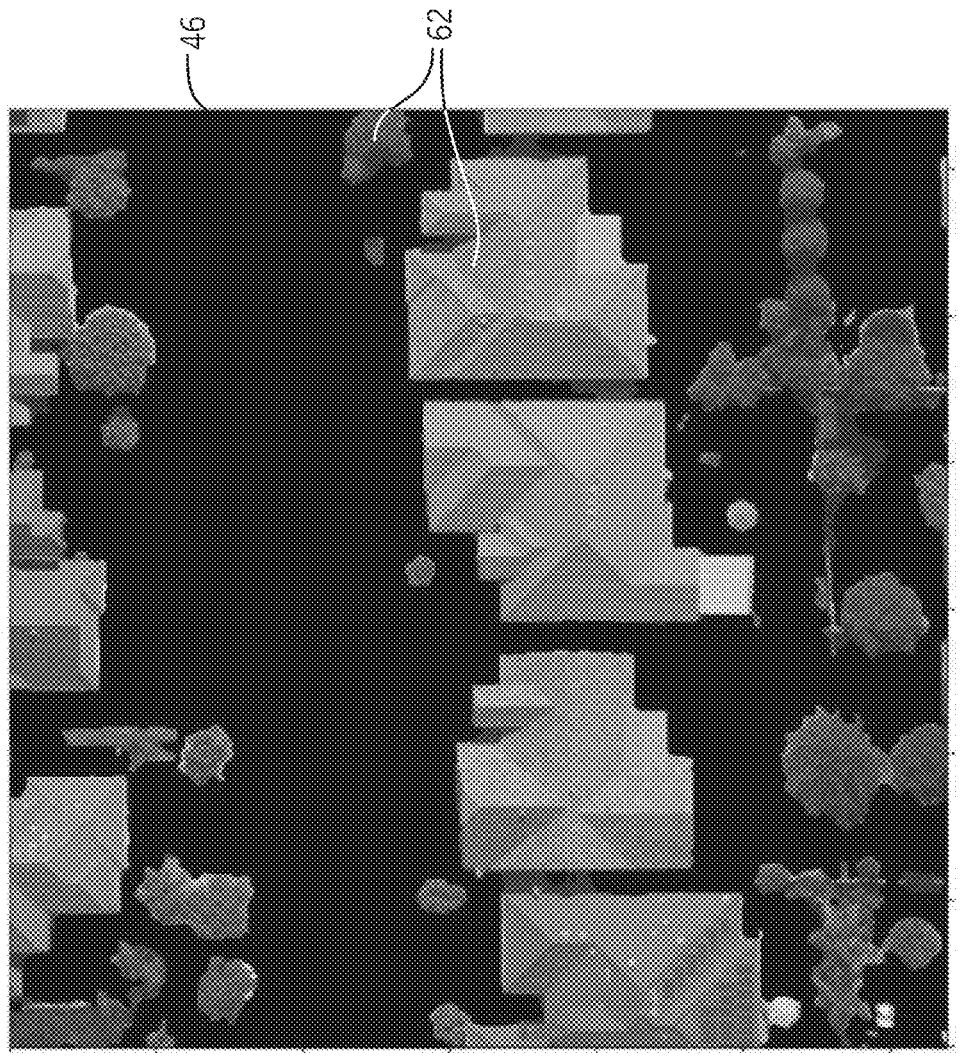
FIG. 5 illustrates the image layer of FIG. 3B with height masking applied to vegetation and structures below a height threshold, in accordance with an embodiment of the present disclosure.

With the foregoing in mind, FIG. 5 illustrates the image layer of FIG. 3B with height masking applied to vegetation and structures below a height threshold, in accordance with an embodiment of the present disclosure. As discussed above, the vegetation analysis computing system 16 may update the image layer 46 based on the height image layer 54 and applied height thresholds. This may enable vegetation and structures not meeting a minimum threshold height (e.g., that do not contribute to wildfire risk) to be removed from the image layer 46, and enables efficient processing of the aerial image data as image data corresponding to low wildfire risk is no longer processed in subsequent analysis steps as it is removed from the image layer 46.

The vegetation analysis computing system 16 may perform height masking on the image layer 46 based on evaluating the height image layer 54 based on a threshold height, and applying the threshold height analysis results from the height image layer 54 to the image layer 46. This enables the image layer 46 to display vegetation and structures that exceed a threshold height and may indicate an increased wildfire risk. The height analysis may include applying a threshold height to the height image layer 54. The threshold height may correspond to 7 feet for vegetation and 12 feet for structures, or any other suitable height value that indicates an increased in wildfire risk for vegetation and structures that exceed the height value. After the analysis is applied, the updated vegetation and structures 62 that remain on the image display may exceed the height threshold, and all other areas of the image may be masked (e.g., blacked out, removed).

Figure 6:
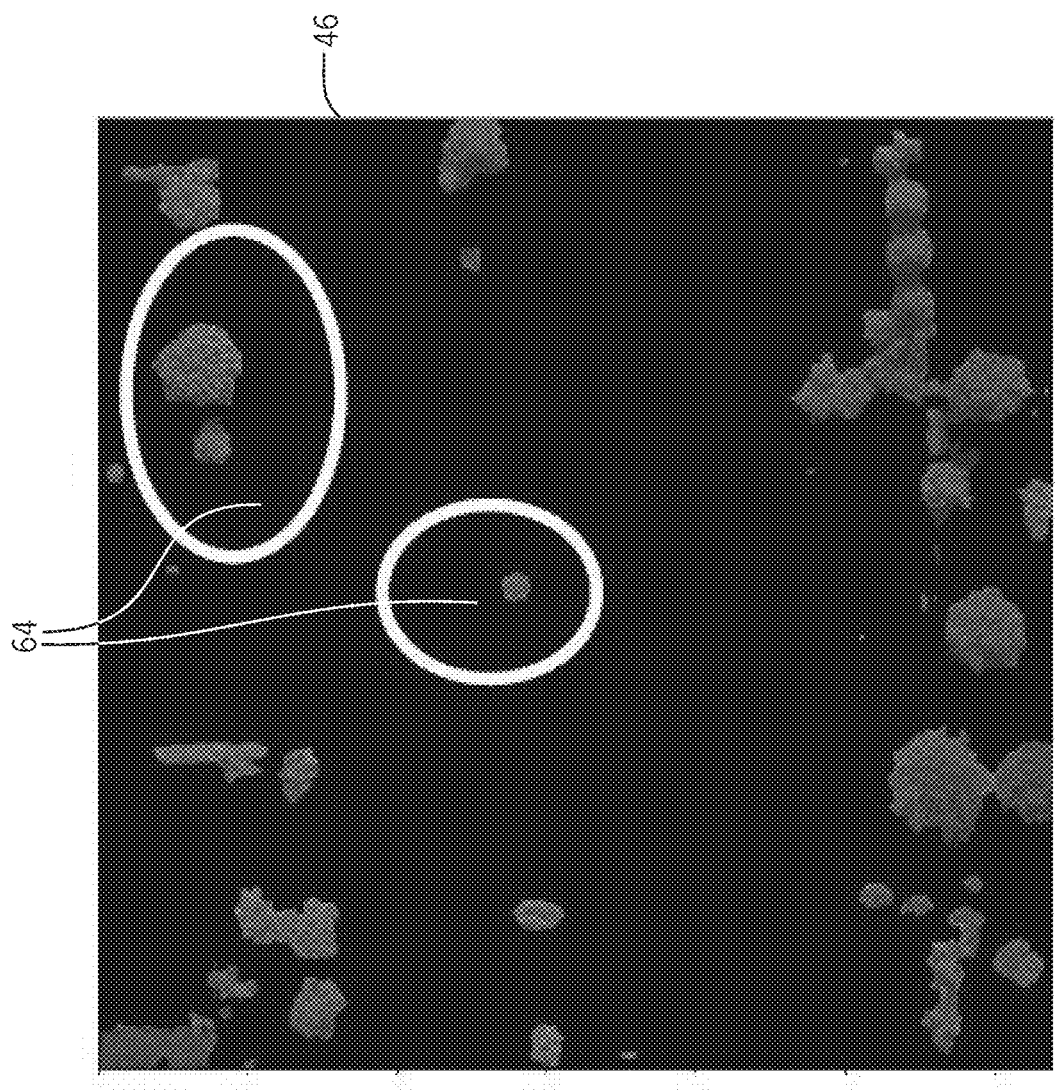
FIG. 6 illustrates the image layer of FIG. 5 with height masking and normalized difference vegetation index (NDVI) applied to mask structures, in accordance with an embodiment of the present disclosure.

With the foregoing in mind, FIG. 6 illustrates the image layer of FIG. 5 with height masking and normalized difference vegetation index (NDVI) applied to mask structures, in accordance with an embodiment of the present disclosure. The NDVI may be applied to the image layer 46 after or prior to height masking operations to identify updated vegetation 64 within the image layer 46. The NDVI enables an automated process for detecting the updated vegetation 64 within an area based on the image data corresponding to the area. The NDVI may be applied to infrared aerial images, and the NDVI includes calculating an index value from the difference between red and infrared bands within the image. The foliage of the updated vegetation 64 may result in NDVI values that indicate a vegetation location, therefore the areas of the image that correspond to the NDVI vegetation values may be included in the image layer 46. The NDVI may enable structures around the property 20 that do not correspond to the updated vegetation 64 to be masked within the image layer, if the wildfire risk assessment needed vegetation load calculations without structure load calculations.

Figure 7A:
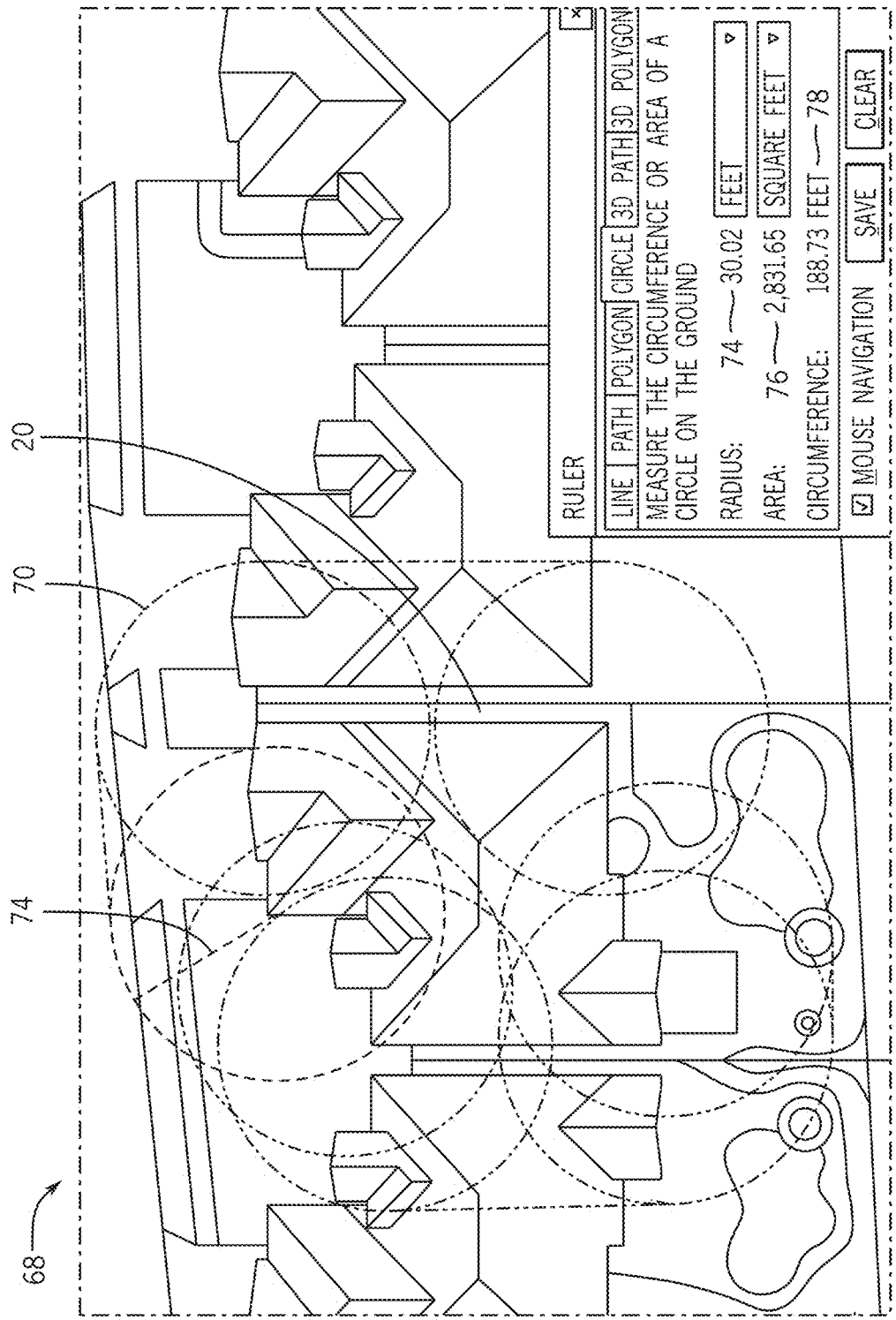
FIG. 7A illustrates determining a predicted defensible perimeter that includes the property and a specified area around the property; in accordance with an embodiment of the present disclosure.

FIG. 7A illustrates determining a predicted defensible perimeter 70 that includes the property 20 and a specified area around the property 20, in accordance with an embodiment of the present disclosure. The vegetation analysis computing system 16 may determine the predicted defensible perimeter 70 around the property 20 for analysis of vegetation and structures. The predicted defensible perimeter 70 may then be applied to the image layer 46 to enable analysis to be completed on vegetation and structures within the predicted defensible perimeter 70 to determine vegetation and/or structure load within the predicted defensible perimeter 70. The predicted defensible perimeter 70 may be calculated based on a distance from the property where vegetation and/or structures correspond to a wildfire risk to the property 20.

The vegetation analysis computing system 16 may compute the predicted defensible parameter 70 using the aerial image data corresponding to the location of the property and defining a radius 74 from the property 20 that includes an area of interest for analysis. The predicted defensible perimeter 70 calculation includes determining the polygon extent of the property 20 and extending the radius 74 from the polygon extent into the perimeter of interest around the property 20. One or more radius 74 may be defined that are within a certain range of the property 20, and one or more defined circles (e.g., circumferences) 78 that includes the one or more radius 74 may be calculated and displayed on the user interface 68.

The predicted defensible perimeter 70 may be determined based on outlining the one or more edges of the circles 78 to create the predicted defensible perimeter. The predicted defensible perimeter 70 may be calculated in square feet, and may be displayed on the user interface along with the radius 74 measurement in feet, and the circumference 78 measurement in feet. The process may be completed by software that may calculate one or more predicted defensible perimeters 70 around the property 20 using one or more circular markings. It should be understood, that any suitable method to create a defensible perimeter corresponding to a specified distance from the property 20 may be implemented.

Figure 7B:
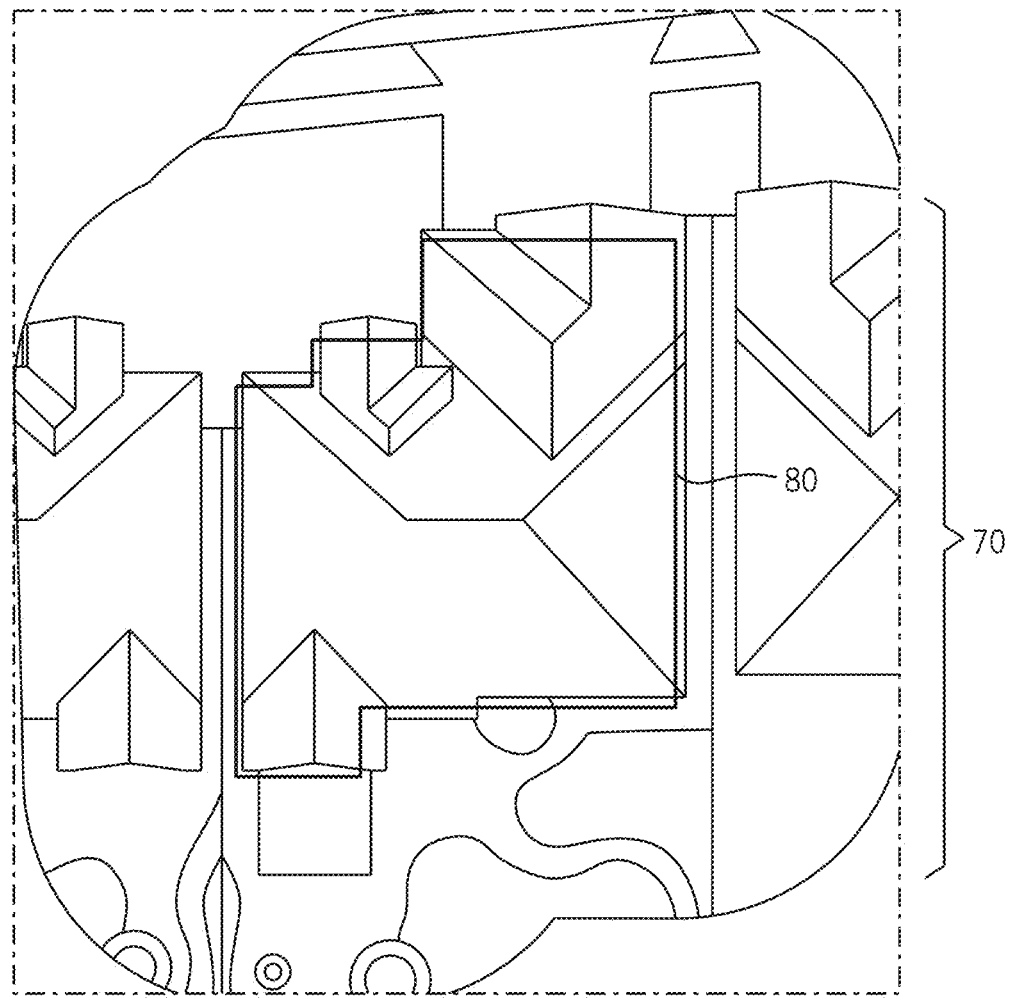
FIG. 7B illustrates the image layer with the perimeter of FIG. 7A, in accordance with an embodiment of the present disclosure.

FIG. 7B illustrates the image layer with the perimeter of FIG. 7A, in accordance with an embodiment of the present disclosure. The vegetation analysis computing system 16 may update the image layer 46 based on the predicted defensible perimeter 70 determined in FIG. 7A. The update may include blacking out and/or removing sections of the image layer that are not within the predicted defensible perimeter 70 of the property. The predicted defensible perimeter 70 may correspond to a range of 5-30 ft from the property 20, 30-100 ft from the property, or any other suitable range corresponding to wildfire risk to the property 20.

Figure 8:
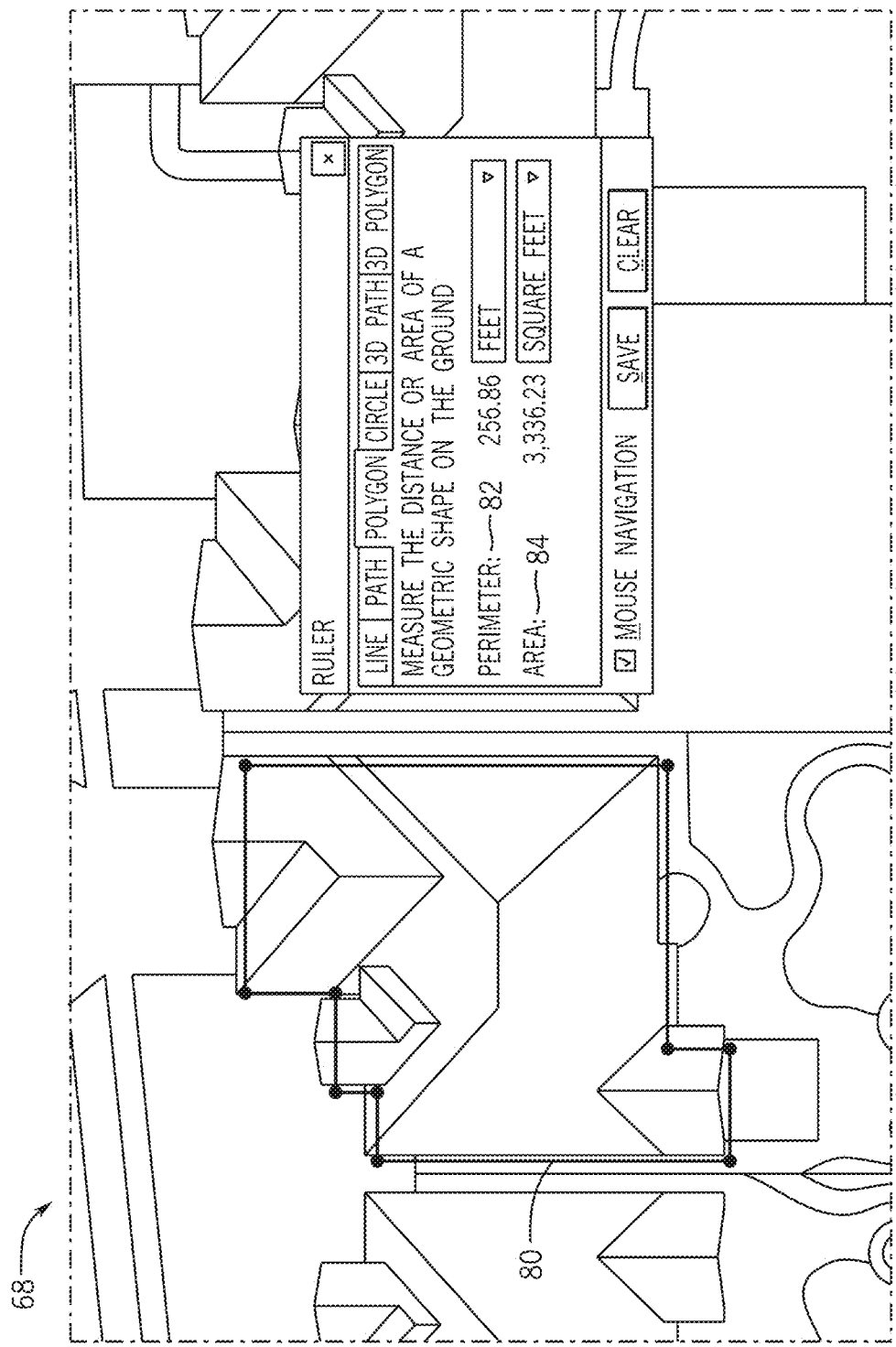
FIG. 8 illustrates calculating the area of a property of the image layer, in accordance with an embodiment of the present disclosure.

With the foregoing in mind, FIG. 8 illustrates calculating the area of a property 84 of the image layer 46, in accordance with an embodiment of the present disclosure. The area of the property 84 may be calculated and excluded in vegetation and structure load calculations within the predicted defensible perimeter 70. This may enable the vegetation and structure load within the predicted defensible perimeter 70 to be calculated without the area of the property included. The area of the property 84 may be calculated by calculating the area of the home polygon in the image layer 46. The perimeter of the property 82 may be measured and displayed on the user interface in feet, and be used to calculate the area of the property 84 based on the area the property 20 takes up within the image layer 46.

Figure 9:
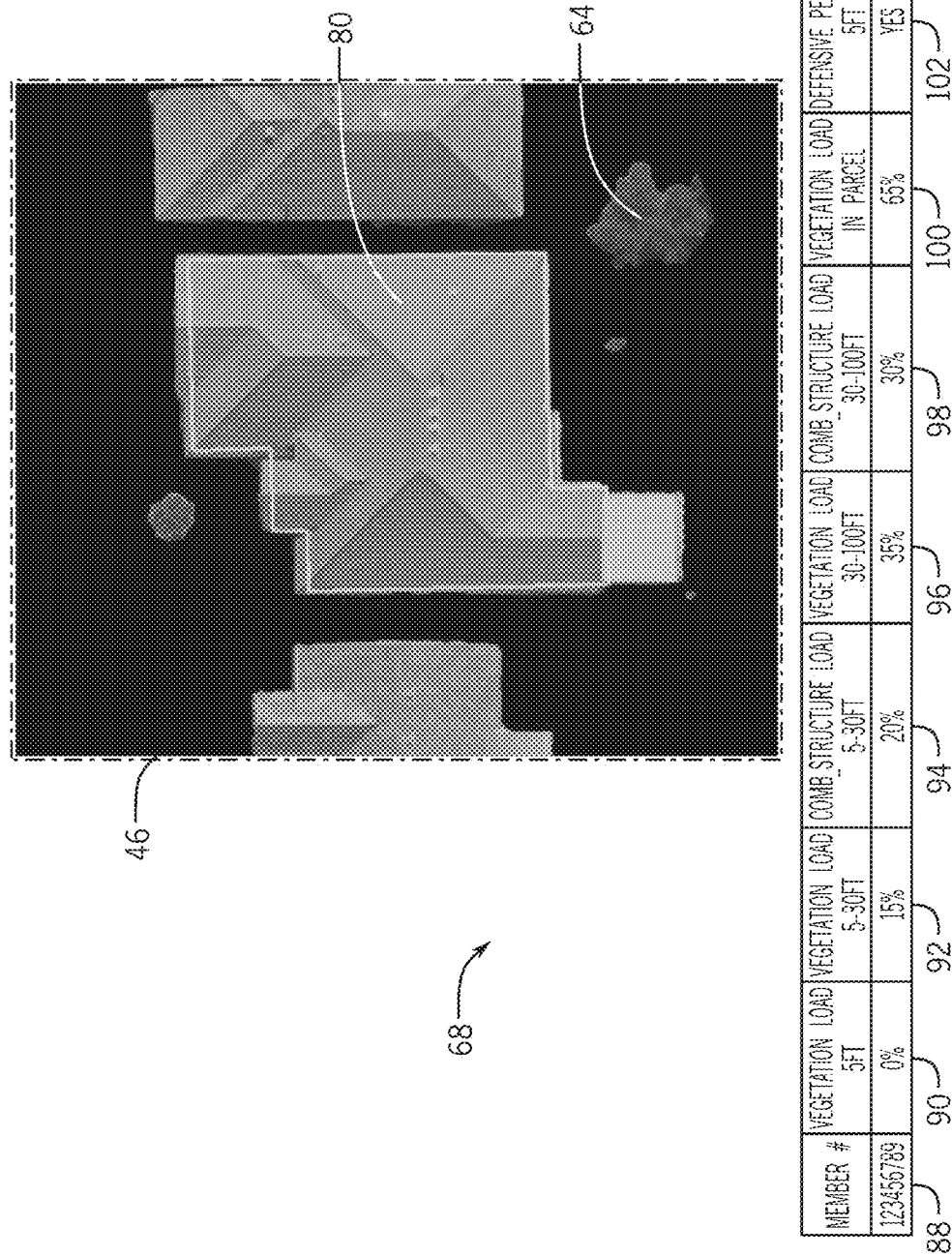
FIG. 9 illustrates a user interface that displays the image layer with height masking and NDVI analysis, and displays generated vegetation and structure load results based on the image layer, in accordance with an embodiment of the present disclosure.

With the foregoing in mind, FIG. 9 illustrates a user interface 68 that displays the image layer 46 with height masking and NDVI analysis, and displays generated vegetation and structure load results based on the image layer 46, in accordance with an embodiment of the present disclosure. The image layer 46 result displayed on the user interface 68 and/or analyzed by the vegetation analysis computing system 16 may include vegetation 64 and/or structures above the height threshold, and include the perimeter of the property 80. The results displayed and/or sent to a device associated with a user and/or administrator of the system may include vegetation load relative to predicted defensible perimeter area, structure and vegetation load relative to predicted defensible perimeter area, and results that define whether one or more predicted defensible perimeter area around the property are defensible perimeters (e.g., below threshold vegetation and/or structure load values). The results may also include a member number 88 associated with the property, so that the vegetation analysis computing system 16 may save the information to a database and retrieve the member information later on demand.

The vegetation analysis computing system 16 may calculate one or more vegetation and/or structure load values of the image layer 46 that includes height masking of objects above a threshold and NDVI applied to identify vegetation 64 within the image layer 46. The vegetation load may be defined as the area of vegetation identified in the image layer 46 perimeter relative to the total area of the predicted defensible perimeter 70. For example, the predicted defensible perimeter 70 may be defined as 5 feet from the property 20, and the vegetation area included in the predicted defensible perimeter 70 may be zero. The vegetation load for the 5 feet perimeter 90 may be calculated as 0%, as no vegetation above the height threshold is within 5 feet of the property. Additionally, the vegetation load for a 5 feet-30 feet perimeter 92 around the property 20 may be calculated based on the area of the vegetation within the image layer that is present within 5 feet to 30 feet of the property 20. The vegetation area may be 20% of the total area within the perimeter of 5 feet-30 feet of the property 20. The result of 20% may be displayed on user interface as a result associated with the member number 88. The vegetation load may also be calculated for the perimeter of 30 feet-100 feet 96 from the property 20. It should be understood, that calculations for vegetation load may be performed for any suitable predicted defensible perimeter 70 determined for the property 20 analysis that related to wildfire risk.

Additionally, the vegetation analysis computing system 16 may calculate a combined structure and vegetation load for the predicted defensible perimeter 70 for the vegetation load. The vegetation analysis computing system 16 may add back in additional structures to the image layer 46 that exceeded the height threshold, after the NDVI analysis on the image layer 46. The vegetation analysis computing system 16 may save the image layer 46 to a database after each analysis step, so the height analysis applied to the image layer 46 may later be retrieved to add back in the structures removed during the NDVI analysis. The vegetation analysis computing system 16 may analyze the combined structure and vegetation load for the perimeter of 5 ft-30 ft 94, which may be determined to be 20% of the total area within the defined perimeter of 5 ft-30 ft. Additionally, the vegetation analysis computing system 16 may analyze the combined structure and vegetation load for the perimeter of 30 ft-100 ft 98. It should be understood that the calculations for structure and vegetation load may be performed for any suitable perimeter determined for the property 20.

The structure and vegetation load may also be calculated based on the vegetation load within the entire area around the property, defined in FIG. 7A, and be display on the user interface as vegetation load in parcel 100 which may correspond to 65%. All the vegetation and/or structural loads may then be analyzed by the system to determine if the predicted defensible perimeter 70 are defensible perimeters based on vegetation and/or structure load values. The defensible perimeters may correspond to threshold vegetation load and/or structure load values that correspond to a perimeter defensible against a wildfire and/or indicates low wildfire risk. For example, the defensible perimeter for 5 ft 102 may correspond to a threshold of 5% vegetation load. The vegetation analysis computing system 16 may determine that the determined vegetation load for a perimeter of 5 ft 76 is 0% and is less than the threshold. The vegetation analysis computing system 16 may then display that the perimeter at 5 ft is a defensible perimeter and display a "Yes" on the user interface. Further, the defensible perimeter at 30 ft 104 and the defensible perimeter at 100 ft 106 may also be determined. The threshold for the defensible perimeter at 30 ft may be 10% vegetation load, and the vegetation analysis computing system 16 may determine that the vegetation load for 5 ft-30 ft 92 is 15% and exceeds the threshold value. The vegetation analysis computing system 16 may then display a "No" for the defensible perimeter 30 ft 104. Additionally, the threshold for the defensible perimeter at 100 ft may be 15% vegetation load, and the vegetation analysis computing system 16 may determine that the vegetation load for 30 ft-100 ft 96 is 20% and exceeds the threshold value. The vegetation analysis computing system 16 may then display a "No" for the defensible perimeter 100 ft 106. It should be understood that any suitable threshold may be determined for the threshold perimeter based on the distance of the perimeter from the property 20, and wildfire risk for the geographical area.

Figure 10:
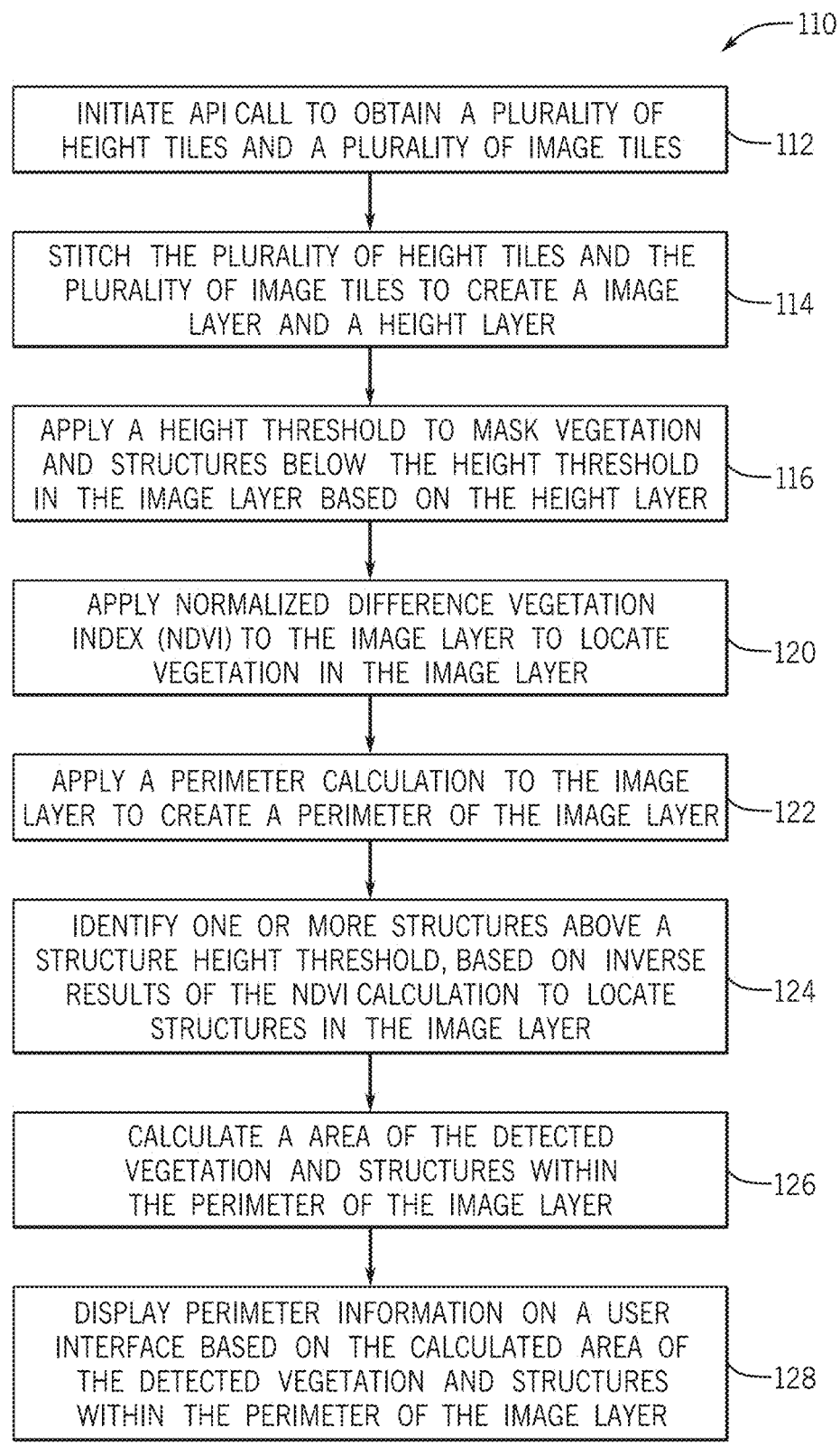
FIG. 10 is a flow diagram of a method of vegetation and structure analysis in aerial property images, in accordance with the present disclosure.

With the foregoing in mind, FIG. 10 is a flow diagram of a method 110 of vegetation and structure analysis in aerial property images, in accordance with the present disclosure. As discussed above, the vegetation analysis computing system 16 may analyze aerial images for a property, and determine the vegetation and/or structure load (e.g., area of vegetation and structures relative to total area within the image) for the property 20. The vegetation analysis computing system 16 may conduct multiple height and vegetation analysis processing steps to determine vegetation and/or structures that should be included in the vegetation and/or structure load calculations.

The vegetation analysis computing system 16, at block 112, initiates an application programing interface (API) call to retrieve multiple height tiles and image tiles. The height tiles may include digital surface data corresponding to latitude and longitude coordinates of a property of interest. Further, the image tiles may be infrared image tiles that correspond to the same property of interest. The vegetation analysis computing system 16, at block 114, stitches together the multiple height tiles to form the height image layer 54. The height scale within the multiple height tiles may be normalized before stitching to account for large height differences across properties within the image. Further, the multiple image tiles are stitched together to form an image layer 46.

The vegetation analysis computing system 16, at block 116, applies a height threshold to mask vegetation and structures below the height threshold in the image layer 46. As discussed above, the height threshold may correspond to an increase in wildfire risk to the property. For example, the threshold height for increased wildfire risk for vegetation may correspond to 7 feet. The height threshold may first be applied to the height image layer 54 that includes elevation data for the aerial images, and the results from the height image layer 54 may be analyzed and translated into the image layer 46. The masking of vegetation and structures within image layer 46 may include blacking out and/or removing sections of the image layer 46 that are below the height threshold based on the digital surface data of the height image layer 56.

The vegetation analysis computing system 16, at block 120, applies a normalized difference vegetation index (NDVI) to the image layer to locate vegetation within the image layer 46. This may enable the vegetation analysis computing system 16 to detect all vegetation within the image layer 46 after and/or before the height analysis is conducted. The vegetation analysis computing system 16 may analyze the NDVI within the image layer 46 and recognize values that correspond to foliage as vegetation, and not structures within the image layer 46. If the height analysis is applied prior to NDVI application to the image layer 46, the vegetation corresponding to foliage based on the NDVI may include vegetation above the height threshold.

The vegetation analysis computing system 16, at block 122, applies a perimeter calculation to the image layer 46 to create the predicted defensible perimeter 70 around the property within the image layer 46. The perimeter calculation may include determining a radius and/or distance from the property 20 that is associated with wildfire risk for the property. The predicted defensible perimeter 70 may correspond to a distance of 0-10 feet from the property 20, 0-100 feet from the property 20, or any suitable perimeter distance associated with an increased wildfire risk. The predicted defensible perimeter 70 defined for the image layer 46 may then be analyzed based on the vegetation and/or structure within the predicted defensible perimeter 70 to establish a load value corresponding to amount of vegetation and/or structures that correspond to increased wildfire risk at the property 20.

The vegetation analysis computing system 16, at block 124, identifies one or more structures above the structure height threshold based on inverse results of the NDVI to locate structures within the image layer 46. For example, the vegetation analysis computing system 16 may locate structures within the image layer 46 after height analysis via the height image layer 56. The vegetation analysis computing system 16 may locate structures by determining the inverse results of the NDVI values within the image layer 46 that do not correspond to foliage values. This addition of structures to the image layer 46 enables structures and vegetation above a height threshold to be analyzed for structure and vegetation load values.

The vegetation analysis computing system 16, at block 126, calculates the area of the detected vegetation and structures within the predicted defensible perimeter 70 of the image layer 46. The area may be calculated based on the area within the image the structures and vegetation take up within the image layer 46. The area may correspond to vegetation and structure load within the predicted defensible perimeter 70, by analyzing the area of the vegetation and structures relative to the total perimeter area. Additionally, the area of the vegetation may be calculated separately to analyze vegetation load alone within the image layer 46. As discussed above, one or more predicted defensible perimeters 70 may be calculated based on distance to the property 20 and wildfire risk associated with distance to the property 20, and one or more areas may be calculated based on the one or more predicted defensible perimeters 70.

The vegetation analysis computing system 16, at block 128, displays perimeter information on a user interface based on the calculated area of detected vegetation and structures within the predicted defensible perimeter 70 of the image layer 46. As discussed above, to determine if the predicted defensible perimeter 70 is a defensible perimeter based on vegetation and/or structure load values it may be compared to threshold values. The defensible perimeters may correspond to threshold vegetation load and/or structure load values that correspond to a perimeter defensible against a wildfire and/or indicates low wildfire risk. The user interface may correspond to a software program that may run on a user device associated with the properties, or may be displayed on any computing device associated with the user and/or the insurance company providing the analysis data. It should be understood, that the analysis process may include any of the steps listed above in any suitable order. Additionally, calculations and perimeters based on the image data may vary based on size of property, geographical location of property, and state mandated guidelines for determining wildfire risks.

Figure 11:
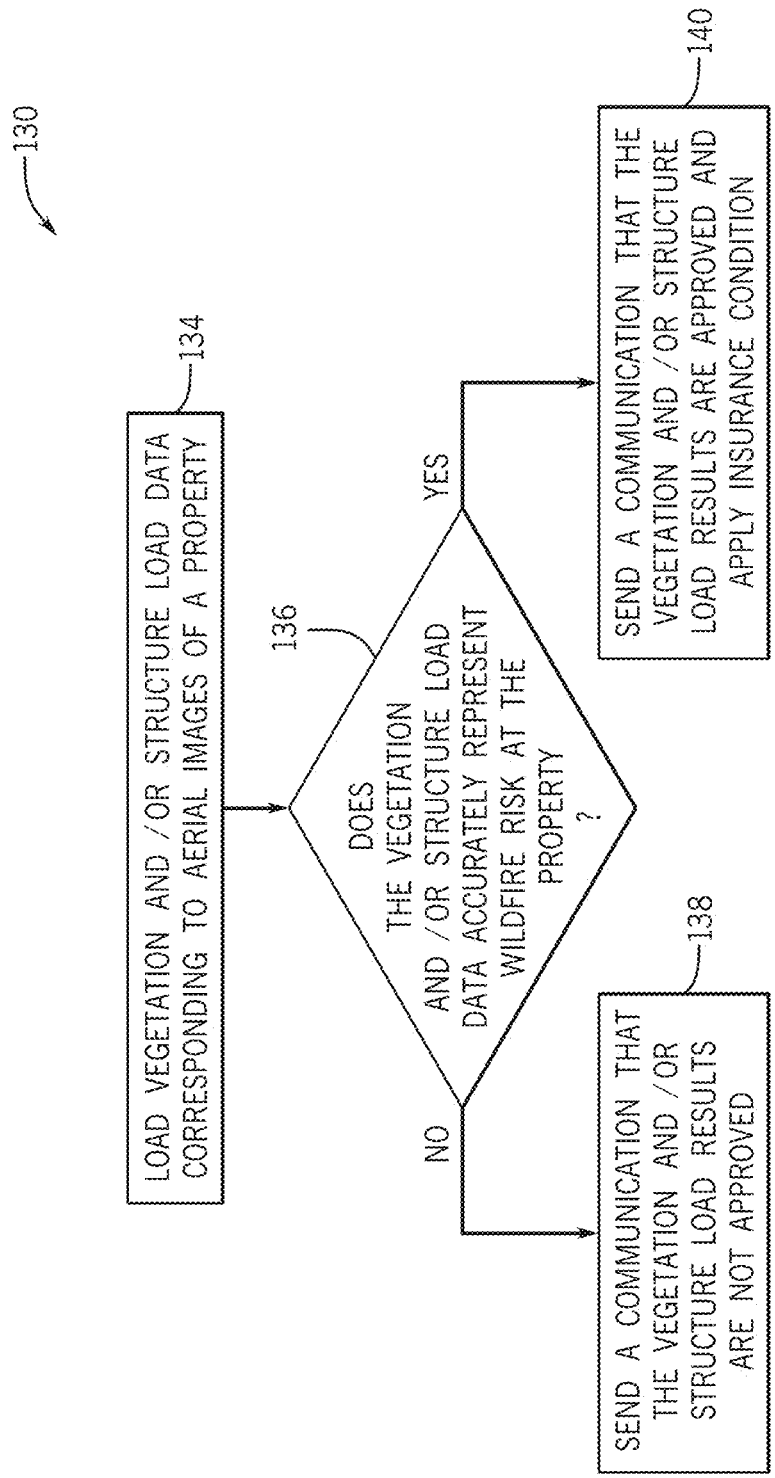
FIG. 11 illustrates a flow diagram of a method of evaluating vegetation analysis results, in accordance with an embodiment of the present disclosure.

With the foregoing in mind, FIG. 11 illustrates a flow diagram of a method 130 of evaluating vegetation analysis results, in accordance with an embodiment of the present disclosure. As discussed above, the vegetation analysis computing system 16 may analyze aerial images for a property, and determine the vegetation and/or structure load for the property 20. The vegetation analysis computing system 16 may then determine whether the property 20 includes one or more defensible perimeters and determines insurance policy adjustments based on the analysis and determination of defensible perimeters.

The vegetation analysis computing system 16, at block 134, may load vegetation and/or structure load results corresponding to aerial images of a target property. The vegetation analysis computing system 16 may receive a request from the client computing system 18 for an insurance policy update in regards to the property and/or may periodically analyze results from aerial property images to determine insurance policy modifications.

The vegetation analysis computing system 16, at decision block 136, may determine whether the vegetation and/or structure load results accurately represent the wildfire risk to the property 20. This may involve determining if trees around the property 20 that have lost leaves during the winter have been indicated as structures rather than vegetation, inaccurate defensible perimeter calculations, and or updates to height and/or vegetation and/or structure load thresholds. The vegetation analysis computing system 16, may utilize machine learning algorithms to verify that the analysis results match predicted results for the property 20 based on the geographical area, and time of year the aerial property images were taken.

If the vegetation analysis computing system 16 determines that the vegetation and/or structure load data is inaccurate, the vegetation analysis computing system 16, at block 138, sends a communication to a device associated with an insurance provider or client of the system that vegetation and/or structure load results have not been approved and further analysis may be required. If the vegetation analysis system determines that the vegetation and/or structure load data is accurate based on comparison to similar properties and/or employee examination, the vegetation analysis computing system 16, at block 140, sends a communication to the client computing system 18 that the results are approved and may also include an insurance policy modification based on the results (e.g., discount).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure. It should be appreciated that features discussed with references to different examples provided herein may be combined. Features shown and described with reference to FIGS. 1-11 may be combined in any suitable manner.

The invention claimed is:

1. A system, comprising:
one or more processors configured to:
receive aerial image data associated with a target property;
apply a height threshold to the aerial image data;
remove one or more sections within the aerial image data that exceed the height threshold;
apply a perimeter calculation to the aerial image data to define a perimeter around the target property within the aerial image data;
apply a normal difference vegetation index (NDVI) to the aerial image data to identify vegetation within the aerial image data;
update the aerial image data based on the NDVI to remove one or more sections above an NDVI threshold value;
update the aerial image data based on an inverse NDVI calculation to add in structures above an NDVI inverse threshold value; and
calculate an area of one or more detected vegetation and structures within the perimeter around the target property within the aerial image data.

2. The system of claim 1, wherein aerial image data comprises one or more image tiles, wherein a center image tile corresponds to the latitude and longitude coordinates of the center of the target property.

3. The system of claim 2, wherein the image tiles are stitched together to create a single image layer.

4. The system of claim 1, wherein the aerial image data comprises digital surface data corresponding to elevation of the vegetation and structures.

5. The system of claim 1, wherein the perimeter is determined to be a defensible perimeter based on the area of the detected vegetation and structures within the perimeter of the aerial image data being below a threshold value.

6. The system of claim 5, wherein a notification is sent to a user device associated with the target property comprising insurance modification information, in response to the determined defensible perimeter.

7. A method comprising:
receiving, via a processor, an image layer corresponding to a target property;
determining, via the processor, one or more areas of the image layer that exceed a height threshold;
modifying, via the processor, the image layer to remove one or more sections that exceed the height threshold;
determining, via the processor, one or more areas around a perimeter of the target property that correspond to a plurality of vegetation based on applying a normalized difference vegetation index (NDVI) to the image layer;
modifying, via the processor, the image layer to remove areas that do not correspond to the plurality of vegetation based on the NDVI;
modifying, via the processor, the image layer to add in structures above the height threshold based on an inverse NDVI analysis; and
determining, via the processor, one or more defensible perimeters based on determining a structure and vegetation load within the image layer.

8. The method of claim 7, wherein the height threshold is a value in the range of 7 feet to 12 feet.

9. The method of claim 7, wherein determining the one or more defensible perimeters comprises determining, via the processor, if the structure and vegetation load within the image layer exceeds a threshold value.

10. The method of claim 7, wherein, in response to determining the one or more defensible perimeters, a notification is sent, via the processor to a user device associated with the target property.

11. A non-transitory computer readable medium comprising computer executable instructions that, when executed by at least one processor, are configured to cause the at least one processor to perform operations comprising:
receiving an image layer corresponding to a target property;
determining one or more areas of the image layer that exceed a height threshold;
modifying the image layer to remove one or more sections that exceed the height threshold;

determining one or more areas around a perimeter of the target property that correspond to a plurality of vegetation based on applying a normalized difference vegetation index (NDVI) to the image layer;

modifying the image layer to remove areas that do not correspond to the plurality of vegetation based on the NDVI;

modifying the image layer to add in structures above the height threshold based on an inverse NDVI analysis; and determining one or more defensible perimeters based on determining a structure and vegetation load within the image layer.

12. The non-transitory computer readable medium of claim 11, wherein the height threshold is a value in the range of 7 to 12 feet.

13. The non-transitory computer readable medium of claim 11, wherein determining the one or more defensive perimeters comprises determining if the structure and vegetation load within the image layer exceeds a threshold value.

14. The non-transitory computer readable medium of claim 11, wherein in response to determining the one or more defensible perimeters a notification is sent to a user device associated with the target property.

* * * * *